Figure 1:
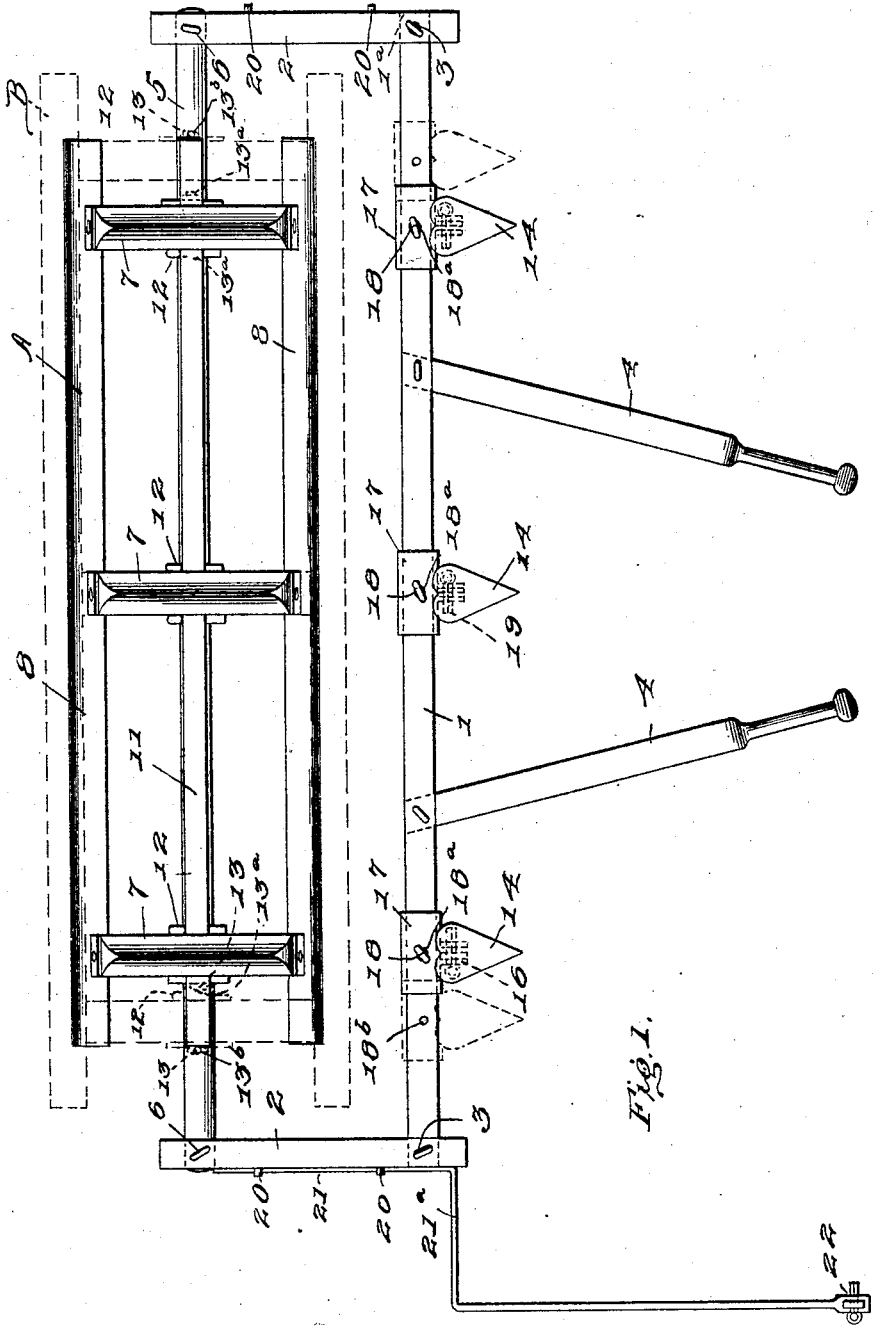

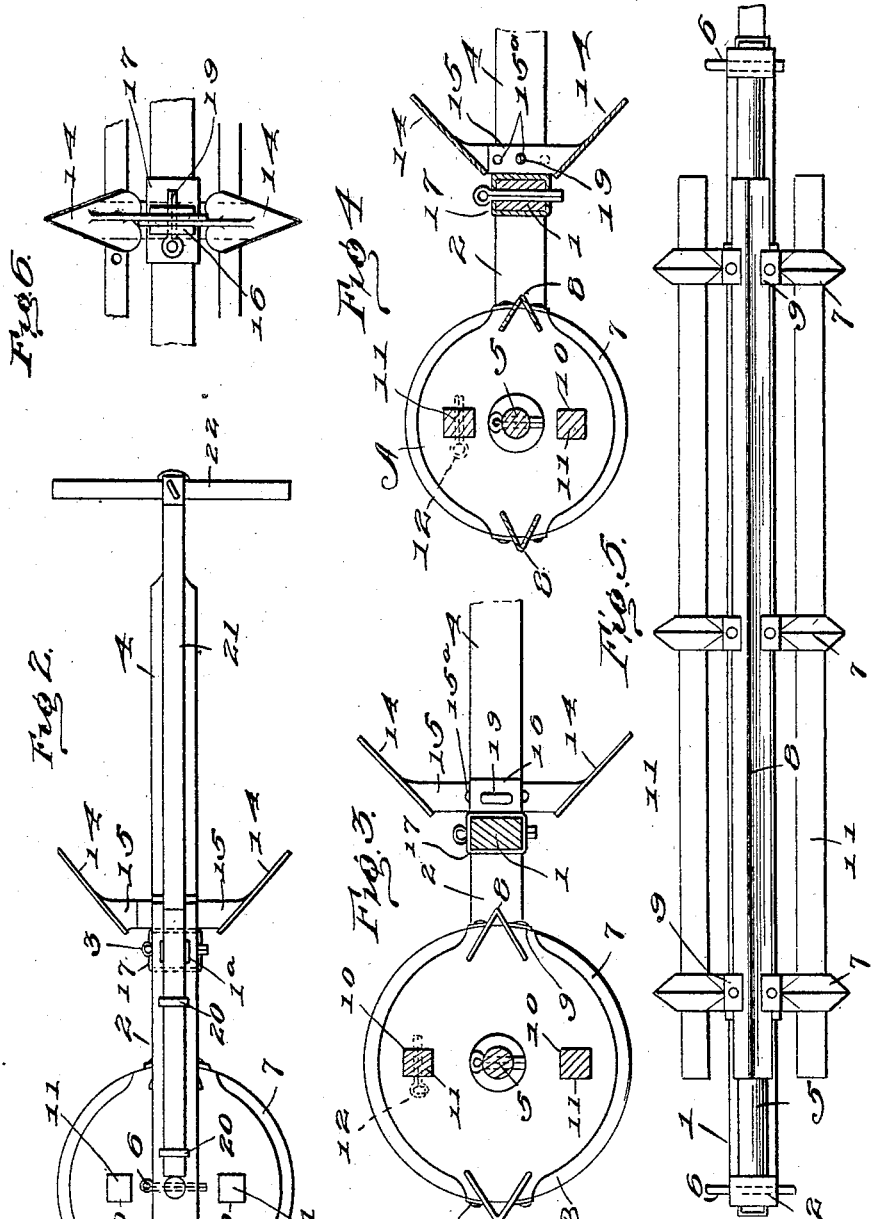

UNITED STATES PATENT OFFICE.

ROBERT G. BOAK, OF THOMPSONVILLE, MICHIGAN.

FIELD AND GARDEN MARKER.

No. 907,721.  Specification of Letters Patent.  Patented Dec. 29, 1908.

Application filed April 13, 1908. Serial No. 427,863.

*To all whom it may concern:*

Be it known that I, ROBERT G. BOAK, citizen of the United States, residing at Thompsonville, in the county of Benzie and State of Michigan, have invented certain new and useful Improvements in Field and Garden Markers, of which the following is a specification.

The present invention relates to an improved marking implement for field and garden planting and contemplates the provision of a device of this character embodying a novel construction whereby the field may be marked off and subdivided into square or rectangular sections by drawing the marker across the field in only one direction.

A further object of the invention is the provision of a novel marking implement which can be utilized for subdividing the field or garden into squares of various sizes, and which is reversible so that it is not necessary to turn the implement at each end of the field.

For a full understanding of the invention and the merits thereof and also to acquire a knowledge of the details of construction and the means for effecting the result, reference is to be had to the following description and accompanying drawings, in which:

Figure 1 is a plan view of a marker embodying the invention, a small rotary marker being shown in full lines and a larger rotary marker being shown in dotted lines. Fig. 2 is a side view of the device. Fig. 3 is a longitudinal sectional view through the device when utilized with the larger rotary marker indicated in dotted lines in Fig. 1. Fig. 4 is a similar view showing the smaller rotary marker. Fig. 5 is a rear view of the device. Fig. 6 is a detail view of one pair of guard members for the marking disks.

Corresponding and like parts are referred to in the following description and indicated in all the views of the drawings by the same reference characters.

The frame of the marker has an approximately U formation and comprises the cross bar 1 and the end pieces 2 which project rearwardly from the cross bar 1 and are detachably connected thereto. In the present instance the extremities of the cross bar 1 are provided with the tongues 1ª which are received within corresponding openings in the end pieces 2 and are engaged by cotter pins 3 passing through the end pieces. Projecting forwardly from an intermediate portion of the cross bar 1 are the spaced handle bars 4 which are preferably detachably connected to the frame although such is not necessary for the purposes of the invention. The end pieces 2 of the frame are connected by a shaft 5 which is parallel to the cross bar 1 and has the extremities thereof loosely received within openings in the end pieces and engaged by the cotter pins 6.

A rotary marker is loosely mounted upon the shaft 5 and operates when the device is drawn across a field to form both the longitudinal marks and the transverse marks which intersect the longitudinal marks to form the squares or rectangular subdivisions. In the present instance two of these rotary markers A and B are provided, the two markers being similar in construction and adapted to be used interchangeably and the marker B being larger than the marker A so as to form squares of a larger size. Each of the markers comprises a plurality of marking disks 7 adapted to be slipped upon the shaft 5 so as to rotate freely thereon and connected at diametrically opposite points upon their peripheries by the transverse marking blades 8. Where the rotary marker forms squares it will be obvious that the spacing between the marking disks 7 must be equal to the peripheral distance upon the disks between the marking blades 8. These marking blades 8 are detachably applied to the disks 7 and can be readily removed therefrom should it be desired to utilize the implement for forming longitudinal marks only. As shown upon the drawing the marking blades 8 are formed from sheet metal strips having a V-shaped cross section, the two wings of the V-shaped strips being cut away to receive the disks and the cut away portions being deflected outwardly to form the tongues 9 by means of which they are detachably secured to the disks. It will also be observed that the several marking disks 7 of each of the markers A and B are provided with the corresponding openings 10 designed to receive the rods 11, the said rods being adapted to be applied to either of the rotary markers and being held in position by means of the cotter pins 12 passing through selected openings in the rods. These rods 11 serve to stiffen the rotary markers and also serve to hold the marking disks 7 properly spaced when the transverse marking blades 8 are removed therefrom. The rotary markers A and B are held against longitudinal movement upon the shaft 5 by means of the cotter pins 13, the said cotter pins passing through the inner pair of openings 13ª when the smaller marker A is being employed and through the outer pair of openings 13ᵇ when the larger marker B is being utilized.

The invention also contemplates the provision of guard members for removing stones or like objects from the path of the marking disks and preventing any obstructions of such a nature interfering with the operation of the implement. A pair of guard members 14 is carried by the cross bar 1 of the frame in alinement with each of the marking disks 7, one of the guard members projecting above the cross bar while the opposite guard member projects below the cross bar and one set of the guard members being in operative position when the frame is swung upon one side of the disks and the opposite set of guard members being in an operative position when the frame is swung upon the opposite side of the disks. It will thus be obvious that the implement is reversible and that when it reaches the end of the field it is merely necessary to move it endwise the required distance and swing the frame upon the opposite side of the rotary marker. The guard members 14 are carried by the shanks or standards 15 which are adjustably received between spaced flanges 16 projecting from sleeves 17 which are slidably mounted upon the cross bar 1. These sleeves are held in an adjusted position upon the said cross bar by means of the pins 18, the said pins of the outer sleeves engaging the openings 18ª when the smaller rotary marker A is employed and the outer openings 18ᵇ when the larger marker B is employed. It will also be observed that the shanks 15 are each provided with a pair of openings 15ª either one of which may be engaged by a pin 19 passing through openings in the flanges 16. In the operation of the marker it is contemplated that the pin 19 engage the inner openings 15ª of the shanks 15 when employed in connection with the smaller rotary marker A, and the outer openings 15ª when the device is employed in connection with the larger rotary marker B.

Each of the end pieces 2 of the frame is provided with a pair of eyes 20 designed to loosely receive one end of a guide bar 21, the said guide bar being formed with an offset portion 21ª and carrying a guide finger 22 at its extremity, the said guide finger being preferably adjustably connected to the guide bar so as to be raised or lowered with respect to the same.

In the operation of the marking implement either of the rotary markers A or B may be placed upon the shaft 5 according to the size of the squares to be formed and the device is then drawn across the field, the marking disks 7 forming the longitudinal marks while the transverse marking blades 8 form the transverse marks which intersect the longitudinal marks and coöperate therewith to subdivide the field into the squares. When the implement reaches the end of the field the same is lifted and moved edgewise until the marking finger 22 is directly over the outer longitudinal mark formed by the marking disks 7 in the previous movement of the marker. The frame is next swung upon the opposite side of the rotary marker and the latter member adjusted so that the transverse markers formed by the blades 8 will be in alinement with the similar transverse marks previously formed. The implement may then be again drawn across the field and the operation repeated until the entire field has been subdivided into the squares.

Having thus described the invention, what is claimed as new is:

1. In a marker of the character described, the combination of a rotary marker, a reversible frame upon which the rotary marker is journaled, and two sets of guard members carried by the frame and adapted to be brought alternately into operative position as the frame is reversed.

2. In a marker of the character described, the combination of a reversible frame, a rotary marker journaled upon the frame, a guide bar carried by the frame, and a guide finger mounted upon the guide bar.

3. In a marker of the character described, the combination of a frame, a rotary marker journaled upon the frame and comprising marking disks, sleeves adjustably mounted upon the frame, and a guard member carried by each of the sleeves in coöperative relation with one of the marking disks.

4. In a marker of the character described, the combination of a reversible frame, a rotary marker journaled upon the frame, sleeves adjustably mounted upon the frame, and a pair of guard members adjustably carried by each of the sleeves, the said guard members being brought alternately into operative position as the frame is reversed.

5. In a marker of the character described, the combination of a frame, a pair of rotary markers adapted to be employed interchangeably upon the frame, each of the rotary markers comprising marking disks, guard members carried by the frame in coöperative relation to the marking disks, and means for adjusting the guard members upon the frame to accommodate either of the rotary markers.

6. In a marker of the character described, the combination of a reversible frame, a pair of rotary markers adapted to be employed interchangeably in connection with the frame, each of the rotary markers being formed with marking disks, two sets of guard members mounted upon the frame in coöperative relation with the marking disks, and means for adjusting the guard members to accommodate either of the rotary markers, the two sets of guard members being brought alternately into operative position as the frame is reversed.

In testimony whereof I affix my signature in presence of two witnesses.

ROBERT G. BOAK. [L. S.]

Witnesses:
 FRED. W. MYERS,
 ORRIN M. NORTHRUP.